(12) United States Patent
Wintzell et al.

(10) Patent No.: US 8,649,735 B2
(45) Date of Patent: Feb. 11, 2014

(54) METHOD AND RECEIVER FOR ESTIMATING AND REPORTING A CHANNEL QUALITY MEASURE

(75) Inventors: Ola Wintzell, Södra Sandby (SE); Bo Lincoln, Lund (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 172 days.

(21) Appl. No.: 13/126,890

(22) PCT Filed: Oct. 22, 2009

(86) PCT No.: PCT/EP2009/063905
§ 371 (c)(1),
(2), (4) Date: Aug. 2, 2011

(87) PCT Pub. No.: WO2010/049345
PCT Pub. Date: May 6, 2010

(65) Prior Publication Data
US 2012/0021693 A1    Jan. 26, 2012

Related U.S. Application Data

(60) Provisional application No. 61/112,447, filed on Nov. 7, 2008.

(30) Foreign Application Priority Data

Oct. 30, 2008    (EP) ...................................... 08167935

(51) Int. Cl.
*H04B 17/00*    (2006.01)
(52) U.S. Cl.
USPC ...................... 455/67.11; 455/63.4; 455/562.1

(58) Field of Classification Search
USPC .................................. 455/67.11, 562.1, 63.4
See application file for complete search history.

(56) References Cited

U.S. PATENT DOCUMENTS

| 6,985,453 | B2 |   | 1/2006 | Lundby et al. |
| 7,031,652 | B2 | * | 4/2006 | Blodgett et al. ............. 455/3.01 |
| 7,907,971 | B2 | * | 3/2011 | Salo et al. ................... 455/562.1 |
| 2005/0018634 | A1 | * | 1/2005 | Mantha et al. ................ 370/334 |
| 2005/0096058 | A1 | * | 5/2005 | Warner et al. ................ 455/446 |
| 2006/0165188 | A1 |   | 7/2006 | Wunder et al. |
| 2007/0057843 | A1 | * | 3/2007 | Chang et al. .................. 342/368 |
| 2008/0064356 | A1 | * | 3/2008 | Khayrallah ................ 455/277.1 |
| 2008/0139153 | A1 |   | 6/2008 | Tuo et al. |

FOREIGN PATENT DOCUMENTS

| CN | 101018088 A | 8/2007 |
| WO | 03/039032 A1 | 5/2003 |
| WO | 2008/030661 A1 | 3/2008 |
| WO | 2008/051038 A1 | 5/2008 |

* cited by examiner

*Primary Examiner* — Gennadiy Tsvey
(74) *Attorney, Agent, or Firm* — Coats & Bennett, PLLC (57) ABSTRACT

A method of estimating and reporting, for a receiver (4) associated with a plurality of antennas (41, 42, 43, 44), a channel quality measure of a wireless communication channel from a transmitter (2) to the receiver, the method comprising the steps of: selecting at least one antenna configuration from a set of mutually different antenna configurations inherent to the receiver; determining a channel quality measure for the selected antenna configuration; and reporting the channel quality measure. The set of mutually different antenna configurations comprises antenna configurations that are allocated to different frequency bands ($FB_1$, $FB_3$). A receiver (4), user equipment, computer program and computer readable medium are also disclosed.

18 Claims, 5 Drawing Sheets

METHOD AND RECEIVER FOR ESTIMATING AND REPORTING A CHANNEL QUALITY MEASURE

TECHNICAL FIELD

Embodiments according to the present invention relates to a method, a receiver, a computer readable medium and a user equipment for estimating and reporting a channel quality measure of a wireless communication channel.

BACKGROUND ART

In a wireless communication network a base station communicates with a user equipment (UE) which is actively located within an area of radio coverage of the base station and comprises a receiver for receiving signals from the base station. Some examples of user equipments include cell phones, PDA's, laptops, mobile broadband modems etc.

User equipments are commonly at different locations within the area of radio coverage with correspondingly different received signal strength and interference levels. Consequently, some user equipments can receive data at much higher data rates than other user equipments. In order to optimally utilize the data transmission time, it is desirable to ensure that the base station transmits to each user equipment in a manner tailored to the channel conditions experienced by the user equipment. Tailoring such a transmission is called link adaptation which is a term used to denote the matching of the modulation, coding and other signal and protocol parameters to the conditions on the radio link.

Moreover, in a spectrum aggregated or multi-band system, several frequency bands, continuous or non-continuous, are allocated for the communication with one UE. The modulation and access format within the band could be of any kind, e.g., orthogonal frequency division multiplexing (OFDM), code division multiplexing (CDMA), frequency division multiplexing (FDMA), etc. In this context, one band is referred to as one "component band".

To enable the base station to perform link adaptation and user equipment scheduling, the user equipment has to feedback a channel quality measure, which may be a so called channel quality indicator (CQI), based on its estimated channel condition. Hence, in various kinds of wireless communication systems, it is currently a common measure to estimate and report a CQI which can be a value, or several values, representing a measure of channel quality for a given radio channel. Usually, a low CQI value is indicative of a channel with low quality and vice versa. A CQI for a channel can be computed by making use of performance metric, such as a signal-to-noise ratio (SNR), signal-to-interference plus noise ratio (SINR), signal-to-noise plus distortion ratio (SNDR) etc. of the communication channel. These ratio-values and other values can be measured for a given channel and then be used to compute a CQI for the channel. Other factors that may be taken into account in CQI are performance impairments, such as Doppler shift, channel estimation error, interference etc.

It should be noted that CQI often does not explicitly indicate the channel quality, but rather the data rate supported by the user equipment given the current channel conditions. More specifically, in this case the CQI may be seen as a recommended data rate over the channel.

The channel quality measure may be represented by the CQI value or by any other measure indicating the quality of a wireless communication channel.

If the base station and UE has a single transmit antenna, the use of channel quality measure, or CQI estimation, for link adaptation and/or user equipment scheduling is rather straight forward. However, today more complex communications systems are employed, such as those making use of multiple-input multiple output (MIMO) and space-time coded systems, for which the channel quality measure may also be dependent on a receiver type in the user equipment. This means that for multi band, greater flexibility in channel quality measure, link adaptation and user equipment scheduling is offered, which implies that improvements would prove beneficial in the art. Further background art is reflected by published patent applications WO2003/039032, US2006/165188, US2008/139153, WO2008/030661, and WO2008/051038.

SUMMARY

In view of the foregoing, it is an object of embodiments of the present invention to provide an improvement of the above techniques and prior art. More particularly, it is an object to provide an improved method and receiver for channel quality measure and reporting.

Hence, according to an embodiment of the invention, a method is provided for estimating and reporting, for a receiver associated with a plurality of antennas, a channel quality measure of a wireless communication channel from a transmitter to the receiver. The procedure of allocating each antenna and corresponding receiver chain to a particular component band, is referred to herein as "antenna configuration" or "antenna allocation". The method comprises the steps of: selecting at least one antenna configuration from a set of mutually different antenna configurations inherent to the receiver; determining a channel quality measure for the selected antenna configuration; and reporting the channel quality measure.

Selecting different antenna configurations at the receiver when determining channel quality measure is advantageous in that, for example, the antenna configurations may be used to provide additional diversity against fading on the communication channel. In respect of achieving additional diversity, a relevant feature of the different antenna configurations is the distance between the different antenna elements of each configuration as well as the number of antenna elements that are active in each configuration, i.e. the number of antennas that actually receive data. This is to a large extent due to the relation between the antenna distance(s) and to the mutual correlation between the channel fading experienced the by the signals at the different antennas. The different antenna configurations may also include antennas with different polarization directions, for further achieving a low fading correlation between the antenna configurations.

Moreover, the different antenna configurations may be used for "receive beam shaping" where the signal from each antenna may be amplified by applying different weighting patterns for achieving a desired sensitivity pattern. By doing this, noise in one particular direction may be ignored while signals in other direction are intercepted by the antennas, i.e. by the antenna configurations.

In case the transmitter has multiple antennas, it is possible to improve the signal-to-noise/interference ratio and/or achieve additional diversity against fading, compared to the use of only multiple receive antenna configurations. However, in this case there is also the possibility to create multiple parallel communication channels over the radio interface, which provides the possibility for very high bandwidth utilization without a corresponding reduction in power efficiency or, in other words, provides the possibility for high data rates within a limited bandwidth without an un-proportionally large degradation in terms of coverage. This is referred to as spatial multiplexing, or MIMO antenna processing.

To conclude, since both fading and receive beam shaping affect the channel quality measure for a wireless communication channel, it is possible to improve the channel quality measure in dependence of what antenna configuration is selected. Furthermore, since the channel quality measure often indicates the data rate supported by the receiver, in a spatial multiplexing system it is possible to measure a channel quality in dependence of how the multiple parallel communication channels are created, i.e. in dependence of which antenna configuration is used.

As described, measuring channel quality based on different antenna configurations provides several advantages.

Moreover, "mutually different antenna configurations" means antenna configurations that are different from each other. This means, as the skilled person realizes, that mutually different antenna configurations may have different signal receive properties.

By "antenna configurations inherent to the receiver" is meant "antenna configurations of the receiver", i.e. that the antenna configurations and their properties belong to the receiver. Here, "antenna configuration" is generally defined by which antenna is allocated to which component band (frequency band) an antenna is allocated. An antenna configuration may also include one or more antennas not being allocated at all.

The method may further comprise the steps of: selecting a second antenna configuration form the set of antenna configurations; determining a second channel quality measure for the second antenna configuration; and determining which one of the selected antenna configurations has the best channel quality measure, wherein the step of reporting the channel quality measures comprises reporting the best channel quality measure. This provides for the transmitter to adapt its transmission signal on order to optimize the channel conditions for the receiver.

The determining of the channel quality measure may comprise determining channel quality measures for a plurality of frequency bands (component bands) of the communication channel, the step of reporting the channel quality measure comprising reporting said channel quality measures and which frequency band each channel quality measure belongs to, which provides further information in respect of how a transmission signal from the transmitter may be optimized. In other words, reporting an antenna configuration comprises reporting each used component band and what channel quality measure the reported component band has. This means that each channel quality measure may be tagged with which component band the measure was determined for. Here, "a plurality" means more than one.

The set of mutually different antenna configurations may comprise antenna configurations having different numbers of antennas that are allocated to the same frequency band, which provides for a better signal reception for the specific frequency band the antennas are allocated to, which also means that a potentially better channel quality measure may be determined. In this context, "allocated to the same frequency band" means that the antennas are configured to, in real time, receive one or more signals transmitted over the same frequency band.

The set of mutually different antenna configurations comprises antenna configurations having antennas that are allocated to different frequency (or component) bands, which provides for an increased data rate and, hence, at least indirectly an improved channel quality measure. Similarly, "allocated to a frequency band" refers to the antennas being configured to, in real time, receive signals of that particular frequency band.

In order to be able to accumulate a large spectral bandwidth the different frequency bands may be discontinuous.

The method may further comprise the step of determining if a channel quality measure fulfills a minimum quality value, and the step of reporting any of the channel quality measures may comprise reporting the channel quality measure for the antenna configuration having the smallest number of antennas allocated to any frequency band. This provides for a more optimal channel quality measure where power consumption is taken into account, since a reduced number of active antennas reduces the power consumption of the receiver. In this case it is sufficient with a minimum channel quality measure.

The method may further comprise the step of determining if a travelling speed of the receiver is above a specific speed value, wherein, if the travelling speed is above the specific speed value, the selected at least one antenna configuration is a predetermined antenna configuration. This is quite advantageous in that a channel quality measure is rapidly reported when needed, for example in case of the receiver being located in a travelling car.

More specifically, the set of antenna configurations may be defined by each unique combination of which antenna of the plurality of antennas is allocated to a specific (component) frequency band of a set of (component) frequency bands.

According to another embodiment of the invention, a receiver configured to be connected to a plurality of antennas is provided, the receiver being configured to estimate and report a channel quality measure of a wireless communication channel from a transmitter to the receiver. The receiver is further configured to: select at least one antenna configuration from a set of mutually different antenna configurations inherent to the receiver; determine a channel quality measure for the selected antenna configuration; report the channel quality measure. The set of mutually different antenna configurations comprises antenna configurations having antennas that are allocated to different frequency bands.

The receiver may comprise and/or be configured to execute any of the features described above in association with the inventive method and has the corresponding advantages.

According to yet another embodiment of the invention a computer readable medium is provided, having stored thereon software instructions for performing any of the features of the described inventive method, when executed in a computer.

According to another embodiment of the invention, a user equipment is provided, comprising a plurality of antennas and the described receiver.

BRIEF DESCRIPTION OF THE DRAWINGS

Embodiments of the present invention will now be described, by way of example, with reference to the accompanying schematic drawings, in which.

DETAILED DESCRIPTION

Figure 1:
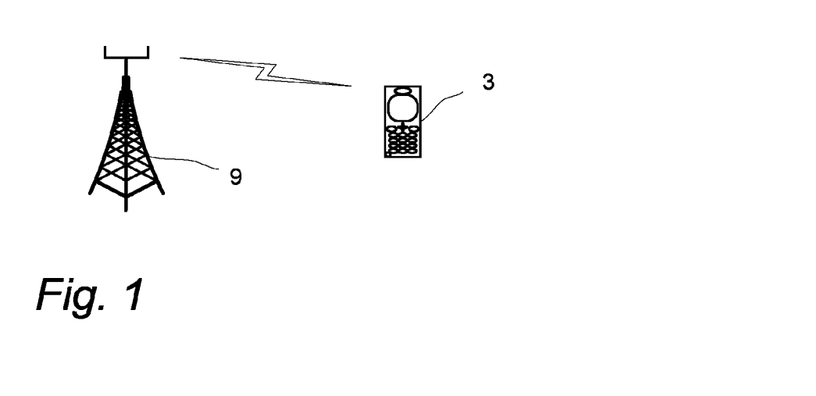
FIG. 1 is a representation of a base station and a user equipment implementing the present invention.

With reference to FIG. 1, a base station 9 and a user equipment 3 in the form of a cell phone are illustrated. Instead of a cell phone, the user equipment may be a PDA, a laptop, a modem, a TV or any other electronic equipment fitted with means for wireless communication via a wireless communication channel established between the user equipment 3 and the base station 9. The base station 9 is in turn connected to a conventional communication network (not shown).

Both the base station 9 and the user equipment 3 comprise means for spatial multiplexing, and more specifically MIMO antenna processing, and are each configured to fulfill the requirements of the 3G Long Term Evolution (3G LTE) proposal for a new mobile cellular. Multi-band transmission will be a principal part of the further releases of 3G Long term evolution (LTE) targeting ITU IMT-Advanced capabilities.

This means that contiguous and non-contiguous spectrums of frequency bandwidths (component bands) are used for the communication channel, which accordingly is an aggregated channel established between the base station 9 and the user equipment 3. Hence, the user equipment 3 is capable of multi band transmission.

Figure 2:
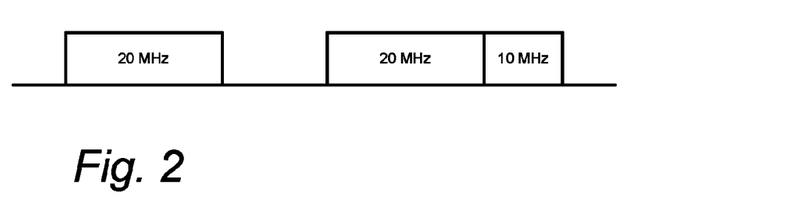
FIG. 2 is a schematic view of an aggregated frequency spectrum.

With further reference to FIG. 2, an example of an aggregated (non-contiguous) frequency spectrum is illustrated. In more detail, the base station 9 and the user equipment 3 can be configured to fulfill the Release 10 standard of the Third Generation Partnership Project (3GPP), to support a non-contiguous or aggregated spectrum by using multi-band technology. That means that each frequency spectrum segment may represent a "legacy LTE" system, according to the Release 8 of the 3GPP standard. The user equipment is then capable of receiving multiple number of LTE bands of different bandwidths transmitted at different carrier frequencies (component bands). As will be described in detail below, there may be at least two component bands available for transmission and the user equipment may have at least two receiver chains, each having at least one antenna.

Even though the description uses 3G LTE as an example, it should be noted that other systems using multiple bands and where multiple antennas are arranged in the receiver, i.e. in the user equipment 3, can be used as well.

Figure 3:
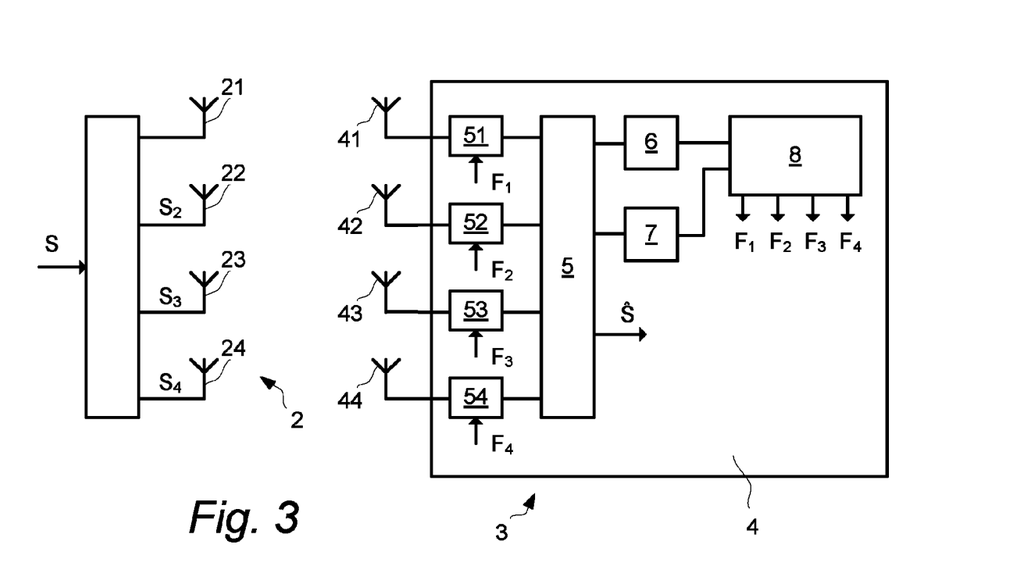
FIG. 3 is a schematic view of a transmitter and a receiver according to embodiments of the invention.

With further reference to FIG. 3, an example of a receiver 4 is illustrated, which is arranged in the user equipment 3 which comprises four antennas 41, 42, 43, 44 that are controlled by a respective radio front end 51, 52, 53, 54. The antennas 41, 42, 43, 44 are arranged at a distance from each other, e.g. a quarter of a median wavelength of a signal transmitted over the communication channel. This means that the combination of four antennas with a respective radio front ends have, by design, different receive characteristics.

In the example, the base station 9 has a transmitter 2 and four antennas 21, 22, 23, 24 that transmit a radio signal S over at least two frequency bands. Since there are four antennas at both the base station 9 and at the receiver 4, several antenna configurations at both the base station and the UE are possible.

Of course, four antennas at the base station 9 and at the user equipment 3 respectively is just an example of the number of antennas. The base station 9 and the user equipment 3 may just as well have another number of respective antennas as long as at least the UE 3 has at least two antennas.

The transmitted signal S is received by the receiver antennas 41, 42, 43, 44, down-converted in the radio front end 51, 52, 53, 54 and sampled by an analog-to-digital converter (not shown). The output from the analog-to-digital converter may then be further filtered and is then fed to a detector 5 that detects the transmitted signal S and outputs a received signal $\hat{S}$ in a manner known within the art.

Communication between the base station 9 and the user equipment 3, which includes multi antenna communication, scheduling, link adaptation and signal processing, is performed in a suitable conventional manner.

However, in addition the detector 5 feeds a received pilot signal, or reference symbols in case of an OFDM system, to a CQI estimator 6 that calculates or determines a CQI for the aggregated communication channel over which the signal S is transmitted. The CQI calculation is done in a suitable known way, such as by making use of performance metric, e.g. a signal-to-noise ratio, signal-to-interference plus noise ratio, signal-to-noise plus distortion ratio, and so forth of the communication channel. These ratio-values and other appropriate values are measured for the pilot channel (containing known pilot symbols) and are then used to compute a CQI for each component band. For antenna configurations where several component bands are used for the communication channel, a total CQI is determined by adding the CQI values for each used component band. This total CQI value may then be seen as a CQI estimation value for the aggregated communication channel.

CQI for each component band is typically determined by first estimating the signal-to-interference ratio (SIR), by using known pilot symbols, and then using a look-up-table for mapping the estimated SIR value to a CQI value. Furthermore, even the description herein is focusing on CQI measurements, channel quality determination it is not limited to such measurements but any suitable channel quality measure may be used, such as a signal strength measure, signal-to-interference measure, signal-to-noise measure, signal-to-interference plus noise measure, signal-to-noise plus distortion measure or any other channel performance indicating metric.

The receiver 4 also comprises a velocity estimator 7 that calculates a velocity of the receiver 4, e.g. by determining the fading of the signal S where a slow fading corresponds to a low velocity. The calculation of the velocity is preferably performed in a manner known within the art, e.g. by using the technology disclosed in the published patent application WO-2006/111277, which document is included by reference. Optionally the base station 9 calculates a velocity of the receiver 4 and sends the calculated velocity value to the receiver 4. A central processing unit 8 arranged in the receiver 4 is fed with the calculated CQI value(s) and the calculated velocity value and is capable of selecting different antenna configurations by setting properties of the antennas 41, 42, 43, 44.

An antenna property is set by sending a respective control signal $F_1$, $F_2$, $F_3$, $F_4$ to the relevant radio front end 51, 52, 53, 54. The control signal comprises information indicating what component band an antenna shall receive a signal on, or information indicating that an antenna 41, 42, 43, 44 shall remain inactive, i.e. that the antenna shall not be used for receiving any signal. The radio front end 51, 52, 53, 54 then controls its associated antenna 41, 42, 43, 44 according to the control signal $F_1$, $F_2$, $F_3$, $F_4$.

Figure 4:
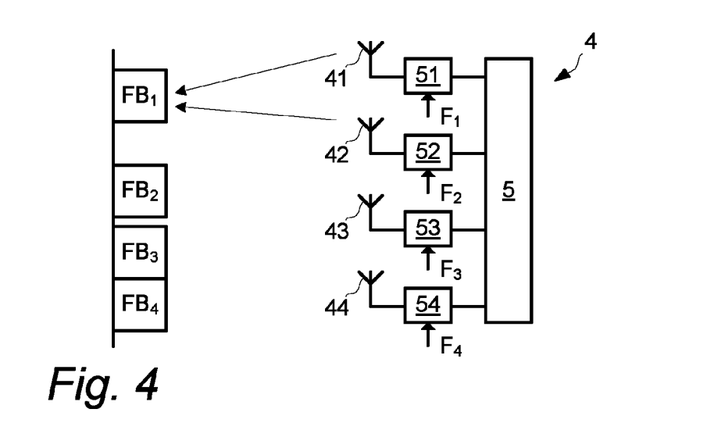
FIGS. 4-6 illustrate different antenna configurations.
Figure 5:
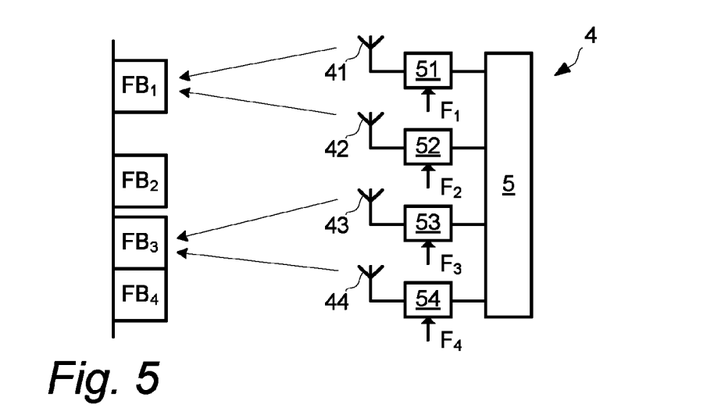
Figure 6:
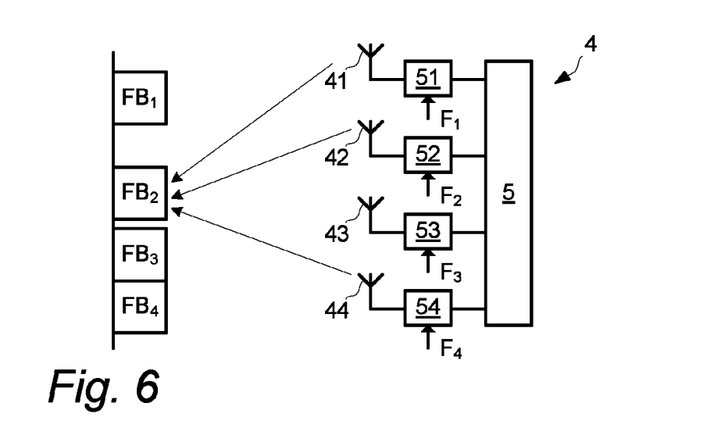

With further reference to FIGS. 4-6, different antenna configurations are illustrated where the signal S is carried on, in this example, four different component bands FB1, FB2, FB3, FB4, i.e. carried on four different frequency bands.

FIG. 4 shows a first antenna configuration where the first antenna 41 and the second antenna 42 receive a signal carried on the first component band FB1. The third 43 and the fourth 44 antenna are not active.

FIG. 5 shows a second antenna configuration where the first antenna 41 and the second antenna 42 receive a signal carried on the first component band FB1, while the third antenna 43 and the fourth antenna 44 receive a signal carried on a third component band FB3.

FIG. 6 shows a third antenna configuration where the first antenna 41, the second antenna 42 and the fourth antenna 44 receive a signal carried on the second component band FB2. In this configuration the third antenna 43 is not active.

Of course, many other unique antenna configurations are possible, e.g. the first antenna receiving a signal carried on FB1 while other antennas are inactive, or the first antenna receiving a signal carried on FB2 while other antennas are inactive, or the first, second and third antenna receiving a signal carried on FB1 while the first antenna receives a signal carried on FB2 (or FB3 or FB4). The available antenna configurations are numerous and each configuration is defined by the unique combination of which antenna is active (and/or inactive), and by which component band an active antenna receives a signal on. This means that the receiver 4 has an available "set of antenna configurations", which set comprises of n number of unique antenna configurations where the value of n depends on the number of available antennas and the number of available component bands. The UE may choose to optimize the order of antenna configurations to measure CQI in, for example to minimize the number of attempts in order to reduce power consumption.

"Antenna allocation" may be used instead of the term "antenna configuration". As discussed, this means that different antennas and receiver chains are allocated for signal reception on different component bands.

Figure 7:
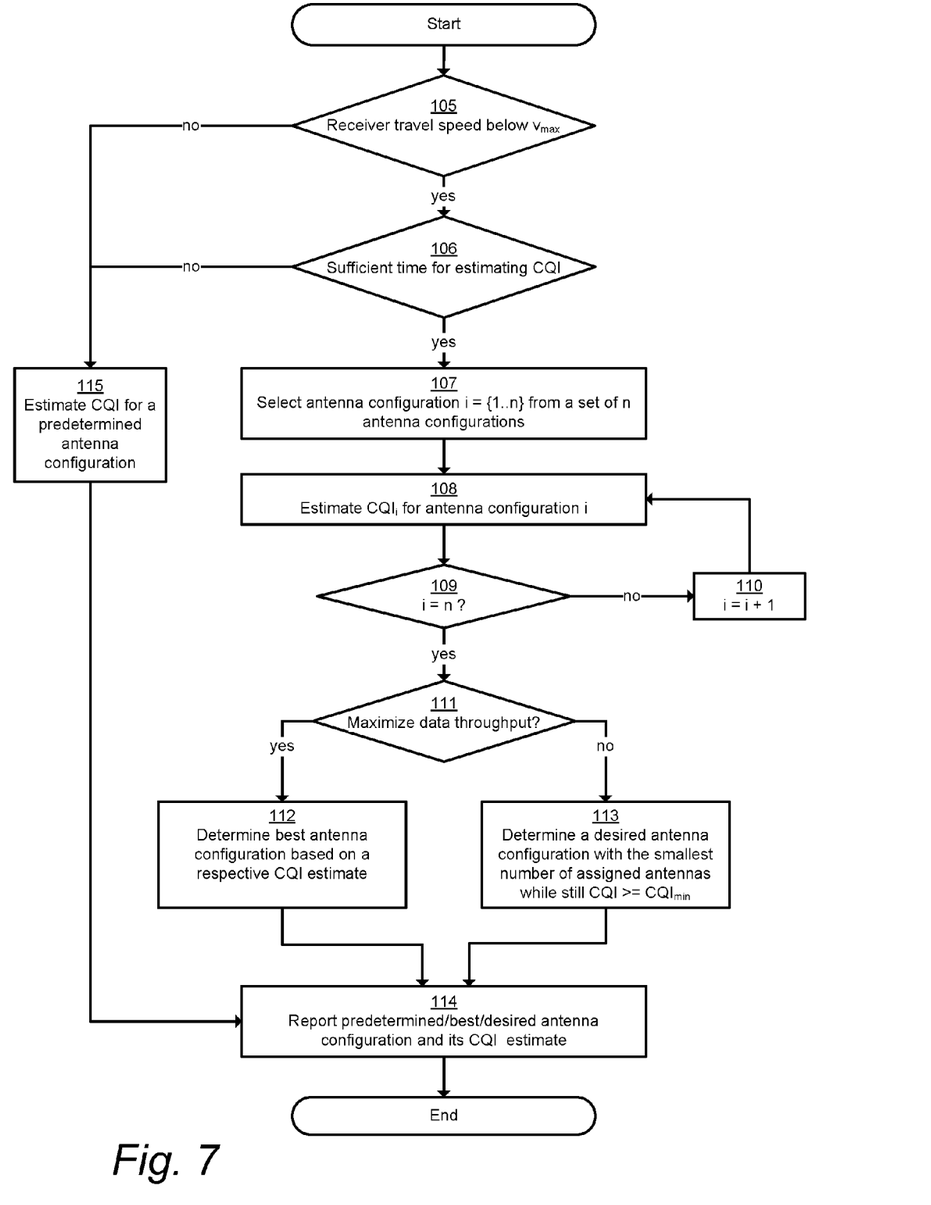
FIG. 7 is a flow diagram of one embodiment of the inventive method.

Turning to FIG. 7 a method for estimating and reporting a CQI is described, where the user equipment 3 and accordingly the receiver 4 is connected via the aggregated communication channel and the base station 9 to the communication network. First the receiver 4, optionally the base station 9 or the network, determines 105 if a travel speed of the receiver 4 is below a predefined maximum speed value $v_{max}$. A typical $v_{max}$ value is within 3-5 m/s but is preferably eventually dependant on the fading rate of the signal, i.e. a very slow or no fading means that the travel speed is very low or zero.

If the speed is below the maximum speed value the receiver 4 determines 106 if there is sufficient time for estimating several CQI values. Typical time constraints for this determination includes for instance the need for reception of data on some certain component bands, at a certain time, i.e. the user equipment needs time to allocate some antennas to these bands.

If there is sufficient time to determine several CQI values, then a first antenna configuration number i is selected 107 from the set of n number of available antenna configurations. A CQI value is then estimated 108 for the selected antenna configuration i, and subsequently all further antenna configurations are selected 110 and their CQI value estimated 108 until it is determined 109 that the previously estimated CQI value was estimated for the latest antenna configuration from the set of n antenna configurations.

In further detail, estimation 108 of the CQI value comprises estimating, or calculating, a CQI value for each component band that is used by the antenna configuration i and then summarizing the CQI values for each used component band. This summarized CQI value then represents the CQI value of the antenna configuration.

A desired CQI value is determined based on the current situation and what quality the UE requires for this situation. For example, the CQI corresponding to the highest total bitrate is the desired CQI (herein denoted best CQI) if the UE is downloading data and the desired CQI is a sufficient enough CQI that gives a desired capacity for VoIP, when the sufficient CQI may be less than the best CQI.

Once CQI values for each antenna configuration has been estimated it is determined 111 if a so called sufficient CQI value is the desired CQI value which is to be chosen to be reported. Generally, when a specific data rate or quality for voice-over-internet protocol (VoIP) shall be met, a sufficient CQI is desirable, with as few active antennas as possible for the purpose of reducing power consumption.

A sufficient CQI may be chosen to be reported, when the desired CQI is sufficient for the present required service and where the CQI value fulfills a minimum quality value. This sufficient CQI may be less than the best CQI. Then a desired antenna configuration (desired component bands) is determined 113, which means that all antenna configurations having a CQI value that is better than a predetermined CQI value are evaluated by determining how many allocated antennas each antenna configuration has. The antenna configuration with the smallest number of allocated antennas is selected as the desired antenna configuration, for the purpose of reducing power consumption. In case two or more antenna configurations have the same smallest number of active antennas, the configuration with the highest CQI value is selected as the desired antenna configuration.

When for example a maximum data throughput or bit rate is desired and the best CQI value may be needed, a best antenna configuration is determined 112 based on its estimated CQI value. Typically the best antenna configuration is the configuration having the best CQI value. A so called best antenna configuration is often desirable when maximum data throughput for download to the user equipment is desired.

When a desired or best antenna configuration is determined, this desired or best antenna configuration and its CQI value are reported 114 to the network via the base station 9.

More specifically, reporting the antenna configuration preferably comprises reporting which component band or bands that are used for transmission of data in the antenna configuration, and reporting the CQI value for the antenna configuration comprises reporting the CQI value for each used component band. Moreover, each component band CQI value has an identification value indicating for which component band it was estimated. Once this is done the base station 9 transmits data to the user equipment 3 on the used component bands.

In case the receiver travel speed was not below the maximum speed value, or if there was not sufficient time to estimate a CQI value, a CQI value is estimated 115 for a predetermined antenna configuration, and this configuration together with its CQI value is reported 114 to the network via the base station 9 instead of a desired or a best antenna configuration.

Here, the predetermined antenna configuration comprises particular antenna or antennas allocated to certain one or more component bands, and component band CQI values are then estimated and subsequently summarized to form an antenna configuration CQI value.

Instead of a predetermined antenna configuration, which may be seen as a fix antenna configuration, other configurations could be used as well. For instance, the used predetermined antenna configuration can be based on a negotiation between the network via the base station 9 and the receiver 4, or can be based on information sent by the network during a radio resource control connection setup.

In the case of estimating CQI for a predetermined antenna configuration, the steps of selecting different antenna configurations and determining corresponding CQI values 107, 108, 109, 110 as well as the steps of determining a best or a desired antenna configuration 111, 112, 113 are omitted.

Figure 8:
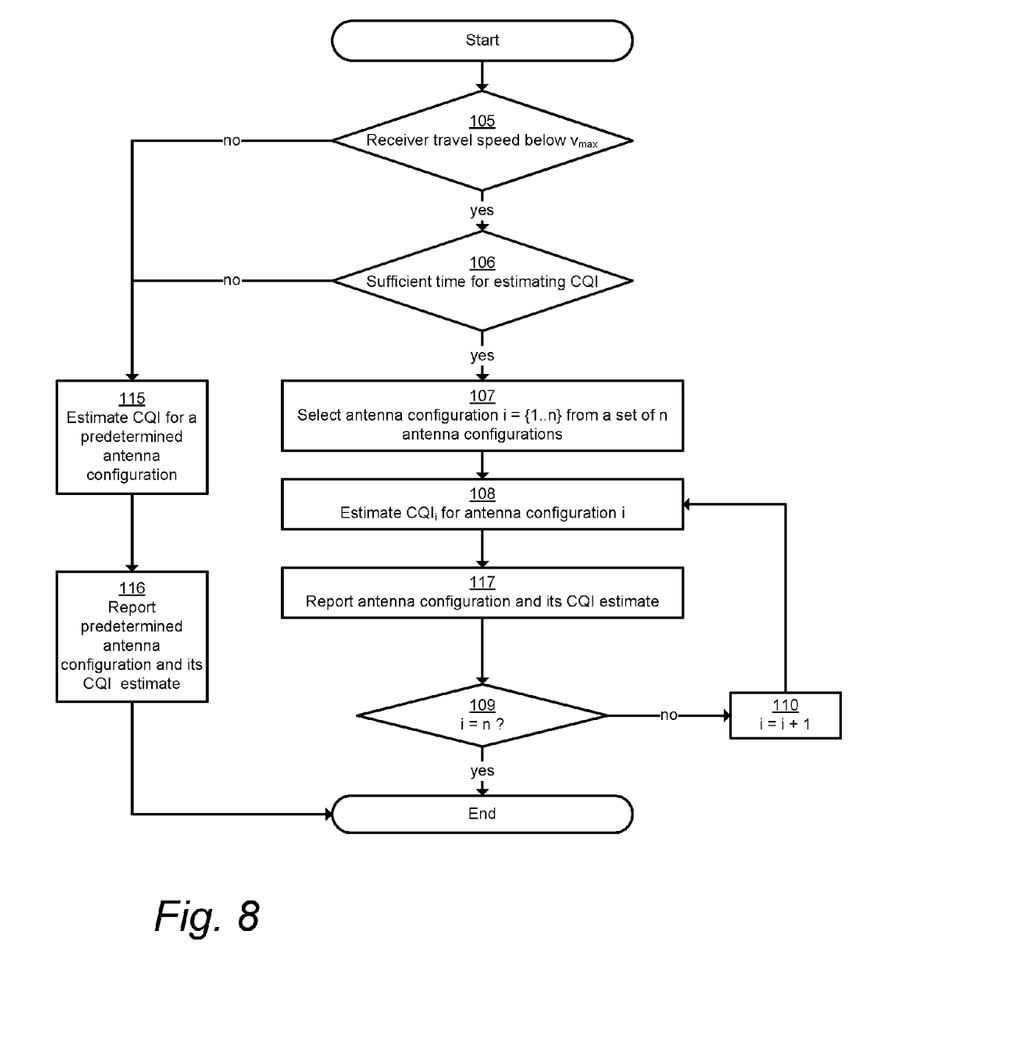
FIG. 8 is a flow diagram of another embodiment of the inventive method.

It is also possible to report the CQI value for each antenna configuration and let the base station determine the optimal configuration, which is schematically illustrated in FIG. 8. Here the receiver 4, optionally the base station 9 or the network, determines 105 if a travel speed of the receiver 4 is below a predefined maximum speed value $v_{max}$.

If the speed is below the maximum speed value the receiver 4 determines 106 if there is sufficient time for estimating a CQI value. If there is sufficient time to determine a CQI value, then a first antenna configuration no. i is selected 107 from the set of n number of available antenna configurations. A CQI value is then estimated 108 for the selected antenna configuration i, and thereafter the antenna configuration i and its CQI value is reported 117 to the network via the base station 9.

All further antenna configurations are subsequently selected 110 and their CQI value estimated 108 and reported 117 until it is determined 109 that the previously estimated CQI value was estimated for the last antenna configuration from the set of n antenna configurations.

Once this is done the base station 9 determines which component bands shall be used, which may be the antenna configuration with the best CQI value, for example in terms of maximum bit rate or throughput, and reports this antenna configuration to the receiver 4. The receiver 4 then uses the reported antenna configuration and corresponding CQI value in a manner known within the art. As mentioned reporting CQI and antenna configuration comprises reporting which component bands that are used and what CQI value has been determined for each component band.

In case the receiver travel speed was not below the maximum speed value, or if there was not sufficient time to estimate additional CQI values, a CQI value is estimated 115 for a predetermined antenna configuration, and this configuration together with its CQI value is used and also reported 116 to the network via the base station 9 instead of each antenna configuration and CQI value. Again, reporting CQI and antenna configuration comprises reporting which component bands that are used and what CQI value has been determined for each component band. Optionally a CQI value representing the aggregated component bands is reported.

The steps 105, 106, 107, 108, 109, 110 and 115 are similar with corresponding steps of the embodiment illustrated in FIG. 7.

The method of FIG. 8 requires that the receiver may be given allocated time gaps for measurements on new constellations. During these gaps there can be either no data or control transmitted (discontinuous transmission) or the user equipment can be scheduled according to a legacy measurement constellation setup.

Figure 9:
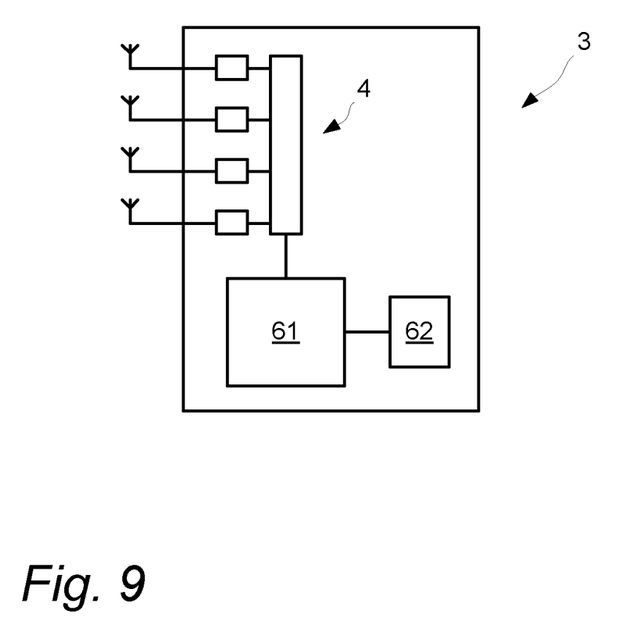
FIG. 9 is a schematic view of the user equipment of FIG. 1.

With reference to FIG. 9, the user equipment 3 is illustrated in more detail and comprises a number of antennas and a receiver 4 according to the description above, to which a computer 61 in the form of microprocessor suitable for mobile devices is connected. A computer readable medium 62 is connected to the computer 61 and on the medium 62 is software instructions for performing the inventive method stored. Although not illustrated, the detector 5, CQI estimator 6, and velocity estimator 7 are comprised in the user equipment 3. The computer 61 comprises the above described central processing unit 8.

Embodiments of the invention may be implemented as long as the receiver is configured to be connected to at least two antennas that are arranged in a user equipment, since this provides for at least two antenna configurations. This means that the receiver illustrated in FIG. 3 is just an example, and that the receiver may be connected to any number of more than two antennas.

Although various embodiments of the present invention have been described and shown, the invention is not restricted thereto, but may also be embodied in other ways within the scope of the subject-matter defined in the following claims.

The invention claimed is:

1. A method of estimating and reporting, for a receiver associated with a plurality of antennas, a channel quality measure of a wireless communication channel from a transmitter to the receiver, the method comprising:
   selecting a first and second antenna configuration from a set of mutually different antenna configurations associated with the receiver, wherein an antenna configuration in the set of mutually different antenna configurations comprises at least two of the plurality of antennas allocated to at least two frequency bands,
   determining a respective first and second channel quality measure for the selected first and second antenna configuration,
   determining if the first and second channel quality measures fulfill a minimum quality value, and
   if both the first and second channel quality measures fulfill the minimum quality value, determining a respective number of antennas comprised in the first and in the second antenna configuration, and reporting the first or second channel quality measure for the first or second antenna configuration having the smallest determined respective number of antennas allocated to any frequency band.

2. The method according to claim 1, comprising:
   determining whether or not data throughput of the channel is to be maximized;
   if data throughput of the channel is not to be maximized:
      determining if the first and second channel quality measures fulfill a minimum quality value,
      if both the first and second channel quality measures fulfill the minimum quality value, determining a respective number of antennas comprised in the first and in the second antenna configuration, and reporting the first or second channel quality measure for the first or second antenna configuration having the smallest determined respective number of antennas allocated to any frequency band, and
   if data throughput of the channel is to be maximized,
      determining which one of the selected first and second antenna configurations has the best channel quality measure, and
      reporting the best channel quality measure.

3. The method according to claim 1, wherein said determining comprises determining channel quality measures for a plurality of frequency bands of the communication channel, and wherein said reporting further comprises reporting the one or more frequency bands to which the one or more reported channel quality measures belong.

4. The method according to claim 1, wherein the set of mutually different antenna configurations comprises antenna configurations having different numbers of antennas that are allocated to the same frequency band.

5. The method according to claim 1, wherein the set of mutually different antenna configurations comprises antenna configurations that are allocated to different frequency bands.

6. The method according to claim 5, wherein the different frequency bands are discontinuous.

7. The method according to claim 1, further comprising determining if a travelling speed of the receiver is above a specific speed value, and, if the travelling speed is above the specific speed value, selecting at least one of the mutually different antenna configurations as a predetermined antenna configuration.

8. The method according to claim 1, wherein the set of antenna configurations is defined by each unique combination of which antenna of the plurality of antennas is allocated to a specific frequency band of a set of the at least two frequency bands.

9. A receiver configured to be connected to a plurality of antennas and to estimate and report a channel quality measure of a wireless communication channel from a transmitter to the receiver, wherein the receiver is configured to:
select a first and second antenna configuration from a set of mutually different antenna configurations inherent to the receiver, wherein an antenna configuration in the set of mutually different antenna configurations comprises at least two of the plurality of antennas allocated to at least two frequency bands,
determine a respective first and second channel quality measure for the selected first and second antenna configurations,
determine if the first and second channel quality measures fulfill a minimum quality value,
if both the first and second channel quality measures fulfill the minimum quality value, determine a respective number of antennas comprised in the first and in the second antenna configuration, and report the first or second channel quality measure for the first or second antenna configuration having the smallest determined respective number of antennas allocated to any frequency band.

10. The receiver according to claim 9, configured to:
determine whether or not data throughput of the channel is to be maximized;
if data throughput of the channel is not to be maximized:
determine if the first and second channel quality measures fulfill a minimum quality value,
if both the first and second channel quality measures fulfill the minimum quality value, determine a respective number of antennas comprised in the first and in the second antenna configuration, and report the first or second channel quality measure for the first or second antenna configuration having the smallest determined respective number of antennas allocated to any frequency band, and
if data throughput of the channel is to be maximized,
determine which one of the selected first and second antenna configurations has the best channel quality measure, and
report the best channel quality measure.

11. The receiver according to claim 9, configured to determine the respective first and second channel quality measure by determining channel quality measures for a plurality of frequency bands of the communication channel, and further configured to report the one or more frequency bands to which the one or more reported channel quality measures belong.

12. The receiver according to claim 9, wherein the set of mutually different antenna configurations comprises antenna configurations having different numbers of antennas that are allocated to the same frequency band.

13. The receiver according to claim 9, wherein the set of mutually different antenna configurations comprises antenna configurations having antennas that are allocated to different frequency bands.

14. The receiver according to claim 13, wherein the different frequency bands are discontinuous.

15. The receiver according to claim 9, further configured to determine if a travelling speed of the receiver is above a specific speed value, and, if the travelling speed is above the specific speed value, to select at least one of the mutually different antenna configurations as a predetermined antenna configuration.

16. The receiver according to claim 9, wherein the set of antenna configurations is defined by each unique combination of which antenna of the plurality of antennas is allocated to a specific frequency band of the at least two frequency bands.

17. A computer program product stored on a non-transitory computer readable medium and comprising software instructions that, when executed in a computer associated with a receiver connected to a plurality of antennas, cause the receiver to estimate and report a channel quality measure of a wireless communication channel from a transmitter to the receiver, the software instructions causing the receiver to:
select a first and second antenna configuration from a set of mutually different antenna configurations inherent to the receiver, wherein an antenna configuration in the set of mutually different antenna configurations comprises at least two of the plurality of antennas allocated to at least two frequency bands,
determine a respective first and second channel quality measure for the selected first and second antenna configurations,
determine if the first and second channel quality measures fulfill a minimum quality value,
if both the first and second channel quality measures fulfill the minimum quality value, determine a respective number of antennas comprised in the first and in the second antenna configuration, and report the first or second channel quality measure for the first or second antenna configuration having the smallest determined respective number of antennas allocated to any frequency band.

18. A user equipment comprising a plurality of antennas and a receiver, the receiver configured to be connected to the plurality of antennas and to estimate and report a channel quality measure of a wireless communication channel from a transmitter to the receiver, wherein the receiver is configured to:
select a first and second antenna configuration from a set of mutually different antenna configurations inherent to the receiver, wherein an antenna configuration in the set of mutually different antenna configurations comprises at least two of the plurality of antennas allocated to at least two frequency bands,
determine a respective first and second channel quality measure for the selected first and second antenna configurations,
determine if the first and second channel quality measures fulfill a minimum quality value,
if both the first and second channel quality measures fulfill the minimum quality value, determine a respective number of antennas comprised in the first and in the second antenna configuration, and report the first or second channel quality measure for the first or second antenna configuration having the smallest determined respective number of antennas allocated to any frequency band.

* * * * *